United States Patent
Emmett et al.

(10) Patent No.: US 6,932,199 B2
(45) Date of Patent: Aug. 23, 2005

(54) DISK BRAKE LINING WITH PROTECTIVE LIP

(75) Inventors: Robert A. Emmett, Rennerod (DE); Wilfried Strauss, Wald-Michelbach (DE)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 10/439,097

(22) Filed: May 15, 2003

(65) Prior Publication Data

US 2004/0026188 A1 Feb. 12, 2004

(30) Foreign Application Priority Data

May 17, 2002 (DE) .......................................... 102 22 110

(51) Int. Cl.[7] ............................................. F16D 55/02
(52) U.S. Cl. ................................. 188/250 B; 188/73.1
(58) Field of Search ............................... 188/73.1, 73.31, 188/73.32, 73.36, 73.37, 73.38, 250 B, 250 G, 251 A, 251 M

(56) References Cited

U.S. PATENT DOCUMENTS

| | | | |
|---|---|---|---|
| 3,433,328 A | 3/1969 | Keine | |
| 3,884,332 A | * 5/1975 | Walther et al. | 188/73.43 |
| 4,315,563 A | * 2/1982 | Hayashi et al. | 188/73.1 |
| 4,773,511 A | * 9/1988 | Giering et al. | 188/73.38 |
| 6,173,821 B1 | 1/2001 | Herffurth | |

FOREIGN PATENT DOCUMENTS

| | | | |
|---|---|---|---|
| DE | 2653607 | * | 1/1978 |
| DE | 2653607 A1 | | 6/1978 |
| DE | 19705836 A1 | | 8/1998 |
| DE | 19850257 A1 | | 5/2000 |
| EP | 248385 B1 | | 12/1989 |
| EP | 745781 A2 | | 12/1996 |
| GB | 2 013 804 A | | 8/1979 |
| GB | 2173267 | * | 10/1986 |

* cited by examiner

*Primary Examiner*—Chris Schwartz
(74) *Attorney, Agent, or Firm*—Howard & Howard

(57) ABSTRACT

Brake linings for a disk brake with a brake disk, a brake caliper, and brake linings. The brake caliper features a lining well for the brake linings. The brake linings feature at least one friction lining and further feature on the side of the brake caliper at least one lip, which is disposed on the brake lining such that it extends beyond the friction face of the friction lining at the face of the brake disk, so that when installed it covers a gap formed between the brake disk and the friction face to protect it from infiltration of dirt from outside.

13 Claims, 4 Drawing Sheets

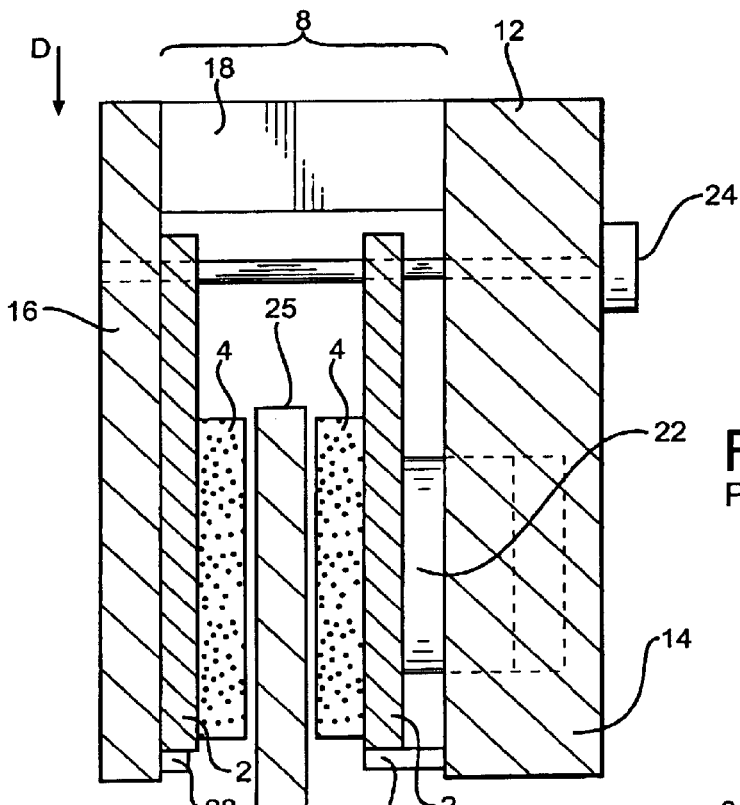
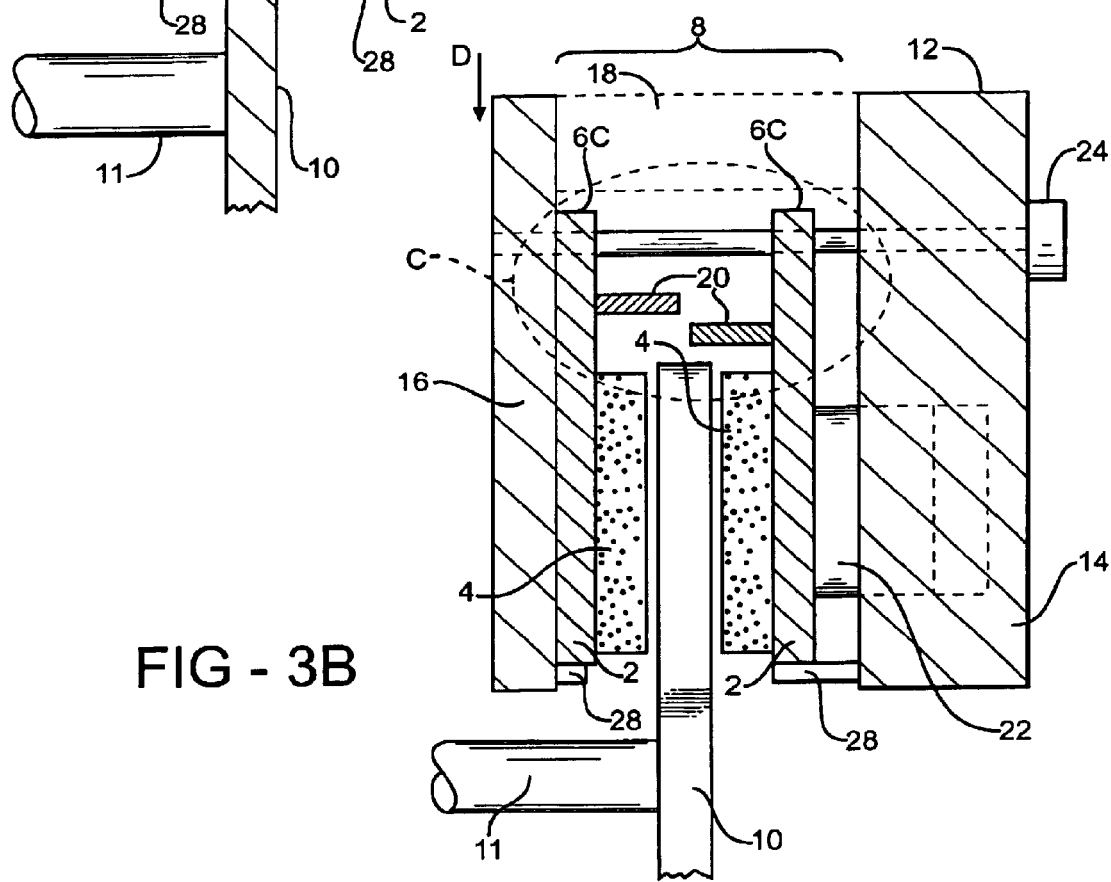
FIG - 3A Prior Art
FIG - 3B

DISK BRAKE LINING WITH PROTECTIVE LIP

BACKGROUND OF THE INVENTION

1. Technical Field

The present invention concerns a brake lining, brake caliper with brake lining, and a disk brake containing these components. In particular, the present invention involves a brake lining, which is guided into a brake caliper through an insertion opening in the latter. Further, the present invention involves disk brakes for especially difficult environmental conditions, such as are encountered by all-terrain vehicles, off-road vehicles, delivery vehicles, or agricultural vehicles.

2. Related Art

Traditionally, disk brakes are comprised of at least one brake disk and at least one caliper with at least two brake linings. Disk brakes are installed in motor vehicles and in machines to brake a shaft or a wheel. The brake linings used within the calipers traditionally consist of a mounting element and the friction lining. The main advantage of disk brakes over the still occasionally used drum brakes is their lower weight, superior heat dissipation, and easier maintenance.

These brake linings are described, e.g. in the German published paper DE 197 05 836 A1. DE 197 05 836 A1 describes a brake lining where the mounting element has a sandwich-like design in order to decrease weight and improve the mechanical characteristics of the brake lining.

For heavy use applications, the brake linings are often designed to achieve even distribution of pressure via so-called compression distribution plates, in order to avoid uneven wearing of the brake lining. The compression distribution plates also allow the use of thinner, and thus lighter, brake linings. The utilization of compression distribution plates and so-called retaining springs is explained, for example, in EP 0 248 385 B1.

EP 0 248 385 B1 gives particular attention to the use of and the need for retaining springs. The retaining springs serve to fix the brake linings in the mounting element.

In order to decrease the weight of the brake linings and to simplify the manufacturing process, the brake lining and its mounting plate can consist of the same material. This is described very clearly in the published paper EP 0 745 781 A2. In this paper, brake linings are described where the mounting plate and the friction lining are manufactured from the same material.

This has the chief advantage that the entire brake lining can be manufactured in a single process.

With today's standard disk brakes, the brake lining is pushed through an opening into the caliper from the outside and is then fastened within the brake my means of retaining springs and locking mechanisms. This type of fastening is advantageous in that the caliper need not be removed or disassembled in order to replace the brake linings. Thus it is possible, for example in the case of a car, to take off just the wheels in order to replace brake linings. However, the opening in the calipers needed for the installation of the brake lining involves a disadvantage in that the lining/spring/locking mechanism/brake disk assembly is exposed in this area. This means that dirt, such as loose asphalt, tar, dust, or even oily particles, can penetrate into the brake through the opening. These particles can accumulate, for example between the brake cylinders and the brake lining and can therefore lead to skewed abrasion. If any contamination of this kind—a piece of loose asphalt, for example—lodges between the brake lining and the brake disk, it could ruin the brake disk. Alternatively, other problems such as jamming of the brake linings, skewed abrasion, or breaking of parts may lead to loss of brake performance and other similar problems.

One option for preventing the infiltration of contaminants between the disk brakes and the friction lining is disclosed, for example, in the German pre-published patent application 26 53 607. In this document, an attempt to prevent the infiltration of contaminants between the friction lining and the brake disk by means of scraper plates is described. This principle is best described with the phrase "brake windshield wiper." The design described therein has several disadvantages, including, for example, the fact that the dirt scrapers are constantly touching the brake disk, which means it is permanently subject to wear even without any braking action. The effectiveness of the system increases with an increase in the pressure on the dirt scrapers, which, however, simultaneously also increases wear and an overall brake effect within the system.

It is one of the objectives of the present invention to provide a brake lining and disk brake which avoid or at least mitigate the above problems simply and inexpensively.

It is another objective of the invention to provide a brake lining that is suitable for resolving the problems described above in regard to existing brake calipers and disk brakes.

It is yet another objective of the present invention to respond to increased demands in terms of the safety and convenience of brake systems.

SUMMARY OF THE INVENTION AND ADVANTAGES

One version of the present invention calls for a brake lining featuring a lip that can prevents dirt or other particles from entering into the space between the friction lining and the brake disk. The brake lining is specifically designed for disk brakes incorporating a single brake disk. This brake lining comprises at least one friction lining with at least one friction surface facing the brake disk. According to this version of the present invention, the brake lining features at least one lip. This lip extends beyond the friction surface of the friction lining so as to overhang the backing of the brake disk, which is gripped by the brake caliper. The overhang is designed in such a way that when a new brake lining is in its at-rest position, the lip extends as far as the plane defined by the gap between the friction lining and the brake disk. The gap is therefore protected from any direct infiltration of contaminants. Since this cover is not completely airtight, however, the infiltration of dirt or foreign particles between the brake disk and one of the brake linings is hindered but not prevented altogether.

When referring to this lip, of which there is at least one, no distinction will be made from now on between the plural and the singular. It should therefore be noted at this point that, for purposes of the brake lining according to the invention, only one lip exhibiting the characteristics described in the sub-claims is necessary.

In one of the preferred designs, at least one of the lips is for the most part flexible. The lip may therefore consist of rubber, for example, or any similar flexible material. The lip may also take the form of a brush, which will essentially provide the equivalent protection against particles and liquids. A brush design could consist, for example, of mineral or other fibers. These fibers must be selected such that they have the required stiffness, given the chosen height of the brush-type lip, to enable them to keep particles away from the gap, and they must be spaced closely enough together so that they will prevent any infiltration of liquids, for example due to capillary attraction. It would also be possible to utilize partially flexible brush lips in which the fibers are resined together only at the installation point, so that they feature a rigid base but extend out into a brush lip.

In another preferred design, at least one lip on the brake lining is essentially rigid. A rigid lip can forestall the possibility that the lip may become deformed and get into the gap between the friction lining and the brake disk. In addition, a rigid lip allows for a thinner, lighter design than a flexible lip. A rigid lip is also more easily mounted on a rigid brake lining.

Another preferred design calls for at least one lip on the brake lining to be a built-in part of the brake lining itself. In this preferred design, either the friction lining and/or the mounting plate and at least one of the lips are manufactured entirely from the same material. This ensures that the brake lining can be manufactured economically. The material of which the lip consists may exhibit the same mechanical characteristics as the friction lining or the mounting plate. The material of which the mounting plate and the friction lining consist, however, may be characterized by a different microstructure or macrostructure, or by a difference in density. Of course, the same also applies to at least one of the lips. The required stability values of the lip may vary, for example, the lip may be designed in thinner or thicker versions. Another option for changing the mechanical characteristics of the lip is differential processing, i.e. by specially compressing or cross-hatching the material, for example in case of duroplastic. This would significantly simplify the manufacturing process.

Another preferred design calls for a brake lining and a lip that constitute separate parts of an assembly. This preferred design features a lip consisting of a different material than that of the brake linings or the mounting element. This means that the lip could, for example, consist of a rubber-like material, or could consist of plastic or sheet metal, which could be fastened to the brake lining, for example by means of welding or riveting. A separate lip part can also alternatively be cast, resined, or sintered to the brake lining during the manufacturing process.

The preferred brake lining will exhibit at least one accommodation for accessories. The preferred design of the disk brake comprises calipers and/or brake linings with additional accommodations for accessories. The disk brake may be outfitted with accessories in or on the brake disk, such as wear indicators or temperature sensors for the brake disk. Further, the brake lining may incorporate accommodations for accessories. Such accessories may also be affixed to or permanently combined with the brake lining during the manufacturing process. The brake caliper and possibly the brake disk as well may feature accommodations and/or service elements permitting the incorporation and/or servicing of these or other additional accessories. In the simplest case, the accessory in question may consist of one additional retaining spring needed to protect the disk brake from damage during installation on the wheel hub. The accessory may also be an abrasion sensor (which may be a part of the brake lining or may be fastened to the brake lining) which indicates when the brake lining should be replaced. The advantage of such sensors, in comparison to traditional wear indicators, is that any indication of abrasion can be observed without having to take the wheel off. However, since the abrasion sensor must be serviced, depending on the type of design used, or needs at least an electric connection in order to communicate the signal, the caliper must accommodate at least this wire or some other form of supply line.

Further accessories that may be fastened to the caliper include: antilock brake system sensors, compressed-air cooling for the brake disk, a telemetric device for tire pressure or tire wear sensors, etc. Since brake calipers are technically very precisely engineered assemblies, which are usually produced via precision investment casting procedures, the retaining elements for accessories can be incorporated easily into the manufacturing process.

In a different version of the present invention, one of the lips, when installed, touches upon the brake disk's backing. This ensures the further minimization of any penetration of dirt or foreign particles into the space between the brake disk and one of the brake linings.

In one of the preferred designs, the brake lining features at least one additional lip located on the surface of the brake lining facing away from the brake disk. This enables it, for example, to protect the brake pistons on the brake caliper or other brake application devices from contaminants.

Another version of the present invention consists of a set of brake linings. The set of brake linings consists of at least two brake linings per disk brake. The brake linings included in the set each feature at least one friction lining with at least one friction surface facing the brake disk.

This set of brake linings is characterized by the fact that at least one of the brake linings features at least one lip extending beyond the friction surface of the friction lining and overhanging the backing of the brake disk, which is gripped by the brake caliper. The overhang is designed in such a way that when a new brake lining is in its at-rest position, the lip extends as far as the plane defined by the gap between the friction lining and the brake disk. The gap is therefore protected from any direct infiltration of contaminants.

In the preferred design, at least one of the brake linings contains at least one recess, which serves to receive at least one lip of one of the other brake linings. This means, for example, that only one of the brake linings that is part of the set of brake linings may feature an especially high lip, which when installed will cover the gaps of both brake linings, and which will be inserted through the second brake lining once the brake linings become worn (see FIG. 4E).

In the preferred design, both brake linings will be provided with lips, so that each brake lining can cover its own gap between disk and friction lining.

In one of the preferred design versions, the lips of each of the brake linings are disposed such that they overlap once installed. This means, for example, that the lips will not touch other lips or the other brake lining even when the friction linings have become worn (see FIGS. 1B, 4A through D).

In the preferred design, both brake linings show essentially the identical design. By selecting an appropriate arrangement of the lips, one set of brake linings may consist of brake linings that have been produced by a single manufacturing tool (see FIG. 1B).

In the preferred design, both brake linings are connected to each other via a shared flexible lip (see FIG. 4F). This serves to provide optimum protection against infiltration of dirt into the gap between the brake disk and the friction lining.

In a different version, the present invention comprises a disk brake. This disk brake features at least one brake disk and at least one brake caliper with a set of brake linings. The brake disk is characterized by the fact that the set of brake linings used in it features at least one lip. This lip on the incorporated brake lining extends beyond the friction surface of the friction lining so as to overhang the backing of the brake disk, which is gripped by the brake caliper. The overhang is designed in such a way that when a new brake lining is in its at-rest position, the lip extends as far as the plane defined by the gap between the friction lining and the brake disk. The gap is therefore protected from any direct infiltration of contaminants. For a more detailed description of the brake lining design, please refer to the above description containing advantageous designs of these brake linings.

THE DRAWINGS

FIG. 3A shows a partial section along the line A—A of the disk brake design from FIG. 2A.

FIG. 3B shows a partial section along the line B—B of the disk brake design from FIG. 1B and FIG. 2B.

DETAILED DESCRIPTION

Figure 1A:
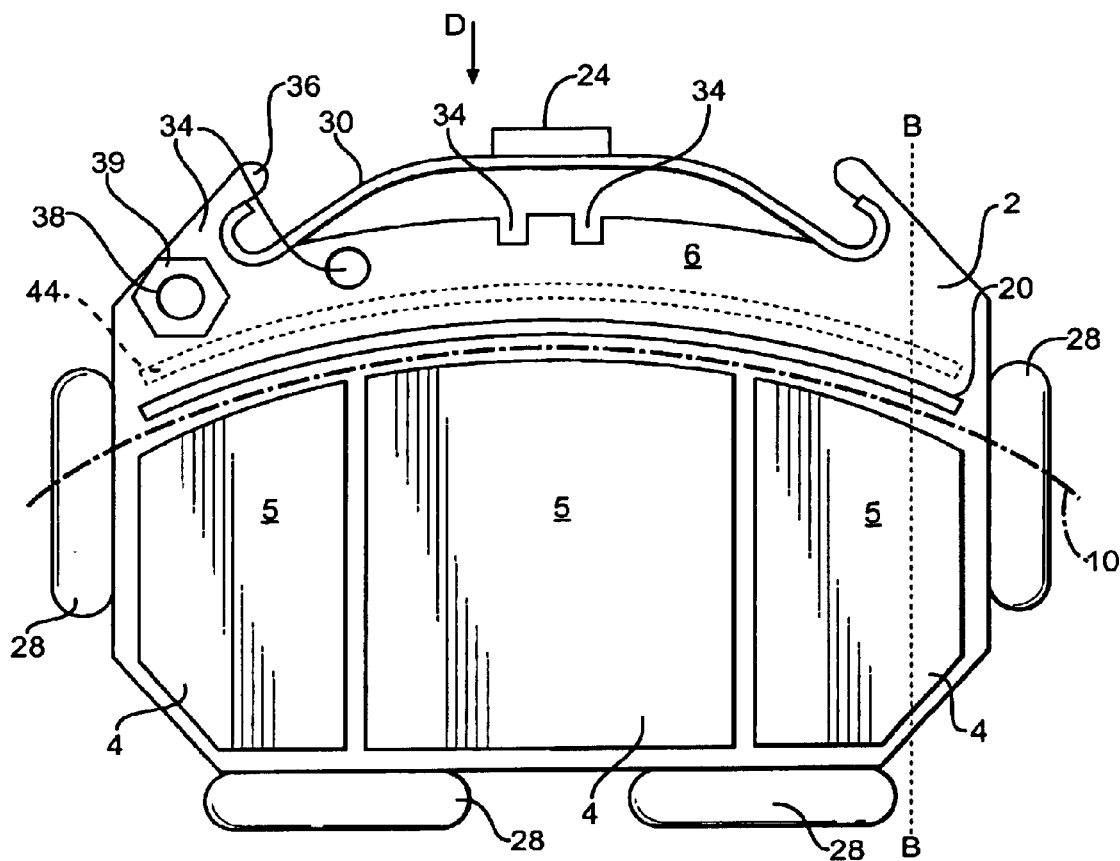
FIG. 1A shows a cross section of a disk brake with a brake lining according to the invention.

FIG. 1A shows a brake lining 2 according to one version of the present invention. The brake lining features a lip 20, which in the installed position extends beyond the brake disk indicated by a dashed line 10. The gap between brake disk 10 and the friction linings 4 is covered by the lip and is thus protected from infiltration of contaminants. The area 44 of the break lining indicated by shading indicates the area where a lip would be situated on the corresponding brake lining (which would be above and parallel to the plane of the drawing). The brake lining 2 may contain recesses in area 44 which can receive the lip of the opposing friction lining once the friction lining gets worn. The recess can also be designed in the form of an opening.

The friction lining mounting plate features a continuous lip 20 along its top edge, with an internal radius (ri) and an external radius (ra), where (ri) is slightly larger than the diameter of the brake disk. At the same time, (ra) has a length such that the ridge is sufficiently stable. The associated brake lining also features a continuous lip along its top edge within the area designated as 44, where the lip has an internal radius (Ri) and an external radius (Ra). Here, (Ri) is slightly larger than (ri), so that the two continuous lips can overlap each other whenever the brake is activated. In regard to this version of the design, the gaps between the friction lining and the brake disk are always protected, whether the brake linings are in a new or a worn state. The dimensions of the lips can even be selected such that they overlap each other even when the brake linings are new, in order to prevent any infiltration of dirt into the area via the opening on the friction surface.

The brake lining, further, can incorporate a mounting plate 6 and friction linings 4. The mounting plate 6 has laterally opposite ends 6a, 6b. The friction linings are disposed with their friction surfaces 5 facing the brake disk. The friction surface 5 serves the purpose of providing the brake effect by providing friction against the brake disk. Mounting plate 6 has accommodations 36 at one end for the retaining spring 30. The retaining spring 30 is shown as a leaf spring. The purpose of the retaining spring 30 is to prevent the brake lining 2 from hitting and possibly damaging the lining guides 28 of the brake caliper lining well during chassis motions. The retaining spring 30 in the Figure is secured by locking device 24, which prevents the entire brake lining 2 from dropping out at the top. The leaf spring 30 shown in the Figure may also be complemented and/or replaced, for example by a coil spring element. Mounting plate 6 further features location elements 34 for additional accessories. The wear sensor 38 is screwed into one of the location elements 34 by means of nut 39. The wear sensor 38 can also be disposed within friction lining 4, or between the friction lining 4 and the mounting plate 6. As the preferred design, accessories can also be integrated into the brake lining 2 as part of the manufacturing process of mounting plate 6 and friction lining 4. In regard to the design of brake lining 2, both the mounting plate 6 and the friction lining 4 can be composed of the same material, which would also result in the advantage that even when friction lining 4 has been completely worn away, the mounting plate 6 will not damage the brake disk, because it is made of the same material.

Figure 1B:
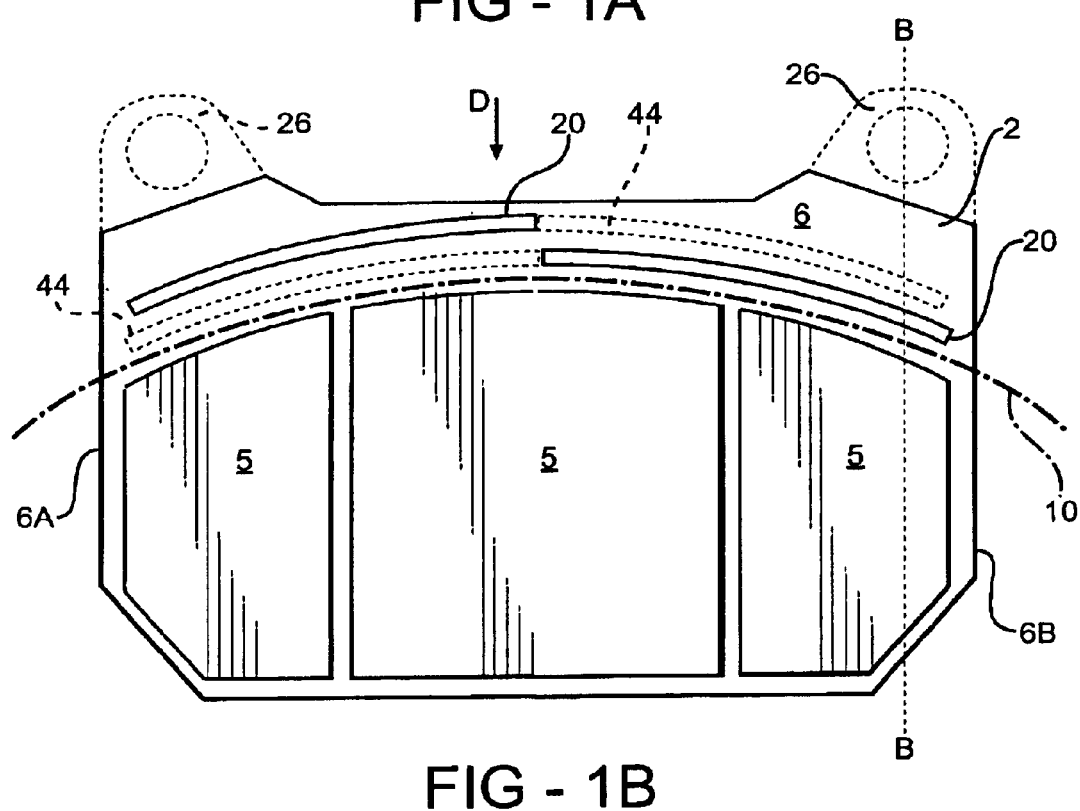
FIG. 1B shows a cross section of a disk brake with a brake lining according to the invention in a different version.

FIG. 1B illustrates a simpler design for brake lining 2. Like the brake lining in FIG. 1A, brake lining 2 incorporates a lip 20, which, however, is divided and is thus different from the one in FIG. 1A. By disposing the lip 20 in a staggered arrangement, only one specific brake lining design can be used. This means that the expenditures for molds and tools for the development of a limited model series, for example, may be cut in half. The brake lining version shown in the Figure may be more complex to install if the lips overlap even when the brake lining is new, because then both brake linings must be installed simultaneously. However, this difficulty can be avoided by utilizing flexible lips, which can slide past each other during installation.

As designated in FIG. 1A, the shaded area 44 indicates the area which may contain a lip disposed on the corresponding brake lining. Different from FIG. 1A, however, in FIG. 1B different elements 26 are provided for the location of locking devices. The location elements 26 for locking devices are shown by dashed lines to indicate that they do not necessarily need to be included. Just as in FIG. 1A, the designation 4 indicates the friction lining, the designation 6 indicates the mounting plate, and the dashed line designated as 10 indicates the location of the brake disk.

Figure 2A:
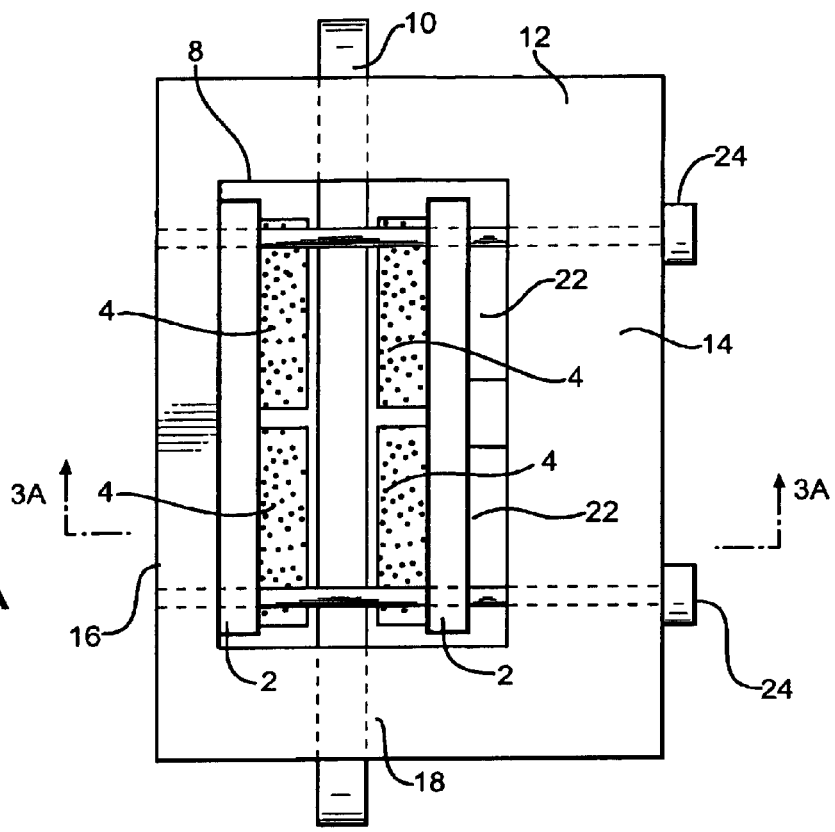
FIG. 2A shows an aspect of a state-of-the-art disk brake from a radial point of view.
Figure 2B:
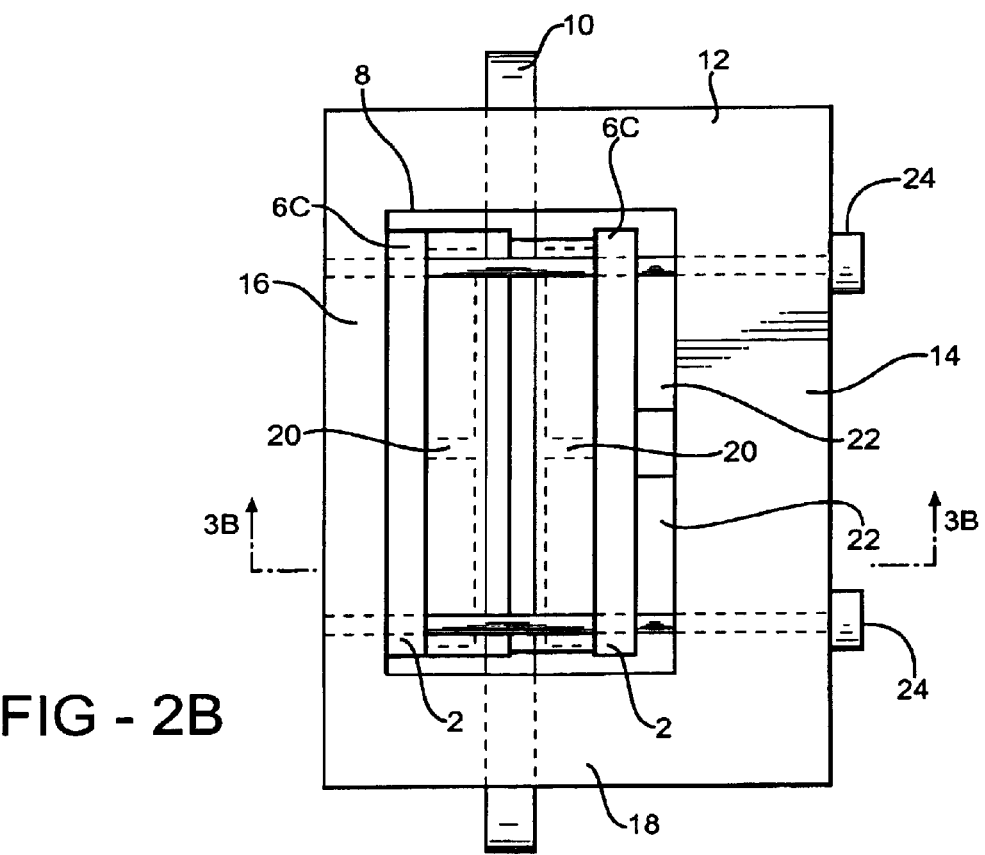
FIG. 2B shows an aspect of a disk brake design according to the invention from a radial point of view.

In FIGS. 1A and 1B the arrow D illustrates the viewing angle for FIGS. 2A and 2B, while the line B—B shows the sectional plane for FIGS. 3A and 3B.

FIGS. 2A and 2B show an aspect of a state-of-the-art disk brake and a disk brake according to the present invention from a radial point of view. The common element in both Figures is the brake disk 10, which is enclosed by caliper 12. The caliper 12 can be divided into its major components, brake application unit 14, counterbrace 16, and the connecting ridges 18. Brake application unit 14 in the present example features two brake cylinders with two brake pistons 22. The brake linings 2 are disposed within an opening 8 for installing the brake linings 2. The opening is emphasized by extra bold lines. The brake linings are secured within the brake caliper 12 by means of the locking elements 24 that engage a mounting portion 6c as shown best in FIGS. 2B and 3B. For reasons of increased clarity, retaining springs are not shown in FIGS. 1B through 4.

In the illustration of the state-of-the-art (FIG. 2A), the gaps between the friction linings 4 and the brake disk 10 are visible through the location opening 8. Thus, dirt particles and liquids may enter unhindered through the opening 8 into the space/the gap between friction lining 4 and brake disk 10, where they can cause the problems described in the introduction.

In the illustration of the disk brake design according to the invention (FIG. 2B), the gaps between the friction linings (shown by dotted lines) and the brake disk 10 are not visible through the location opening 8. Thus, dirt particles and liquids cannot enter unhindered through the opening 8 into the space between the friction lining and the brake disk 10, because the direct path is covered by the lips 20.

FIGS. 3A and 3B show a partial section of the disk brakes according to the state-of-the-art and according to the present invention shown in FIGS. 2A and 2B, respectively. The common element in both Figures is the brake disk 10, which is mounted on shaft 11 and enclosed by caliper 12. The caliper 12 can be divided into its major components, brake application unit 14, counterbrace 16, and the connecting ridges 18. The brake application unit 14 in the present example features brake cylinders with brake pistons 22. The brake linings 2 are disposed within an opening 8 for installing the brake linings 2. The brake linings are secured in place by means of the guides 28 and are locked in place by means of the locking elements 24.

FIG. 3A shows a partial section along the line A—A of the state-of-the-art disk brake design from FIG. 2A. In FIG. 3A, the gaps between the friction linings 4 and the brake disk 10 are visible from above through the location opening 8. Thus, dirt particles and liquids may enter unhindered from above through the opening 8 into the space/the gap between friction lining 4 and brake disk 10, where they can cause the problems described in the introduction. The face of the brake disk 10 in FIG. 3A is designated as 25.

FIG. 3B shows a partial section along the line B—B of the disk brake design from FIG. 2B. In this illustration of the disk brake design according to the invention (FIG. 3B), the gaps between the friction linings 4 and the brake disk 10 are not visible from above through the location opening 8. Thus, dirt particles and liquids cannot enter unhindered from above through the opening 8 into the space between the friction lining 4 and the brake disk 10, because the direct path is blocked by the lips 20.

FIGS. 4A through 4I each show special designs of the brake lining lip as detail representations of C in FIG. 3B. In FIGS. 4A through 4I, the representation of the brake caliper was excluded entirely, and the representation of the brake disks in part, in order to achieve greater clarity.

All parts of FIG. 4 represent sections of various sets of brake linings.

Figure 4A:
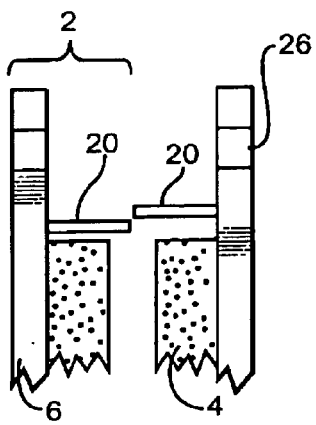
FIGS. 4A through 4I show different versions of the brake lining lip as detail representations of C in FIG. 3B, respectively.

For example, in FIG. 4A a set of brake linings corresponding to FIGS. 1A, 2B, and 3B is shown. This set of brake linings exhibits two brake linings 2 which, in the design illustrated in the Figure, incorporate one mounting plate 6, one friction lining, and at least one lip 20 each. Further, the brake linings in this design also incorporate recesses for a locking device 28.

Figure 4B:
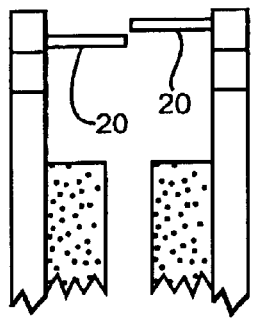

In FIG. 4B, the lips 22 are disposed above the recesses for a locking device 28, in contrast to FIG. 4A.

Figure 4C:
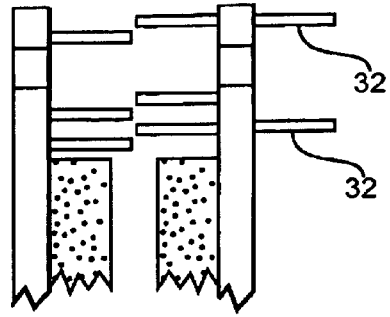

FIG. 4C essentially represents a combination of the lips from 4A and 4B, which in addition feature two more lips 32 for the protection of the brake application units. This design would mean that the brake application units would be on the right side of the illustration. The lips 32 also serve to protect the disk brake's brake application units from contamination.

Figure 4D:
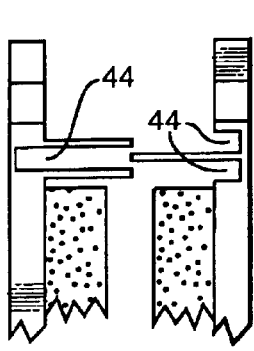

FIG. 4D represents a design where the lips are staggered. Further, the brake linings (here disposed within the mounting plate) feature the recesses 44. Theses recesses 44 allow for a longer design for the lips, which guarantees that the lips cover each other in the case of new brake linings, even when thick friction linings and thin brake disks are used.

Figure 4E:
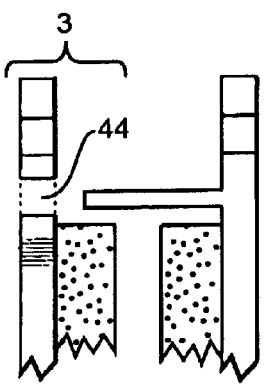

FIG. 4E represents a set of brake linings where only one brake lining features a lip, and the other brake lining 3 a mouth 44. In this design, the lip can be much higher than in others. This construction is especially suitable in cases where the brake lining 3 is inserted into the caliper on the side of the brake application device. This construction makes it particularly easy to integrate a wear indicator into the lip, for example by utilizing markings on the lip that show when the brake lining needs to be replaced, for example, when the marking becomes visible behind the second brake lining, or if it disappears in the second brake lining.

Figure 4F:
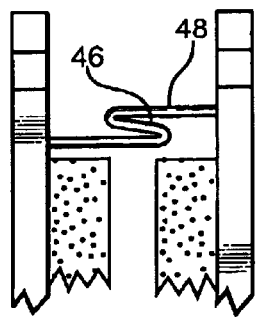

FIG. 4F shows a set of brake linings where the two brake linings are connected to each other by means of a common lip 46/48. This design can achieve an especially excellent dirt resistance. In this version, the lip features two different areas characterized by different densities. The connecting lip's foundation element 48 is essentially rigid in order to provide a definite shape to the lip. The middle section 46 is essentially flexible or elastic, so that the brake linings may move against each other. This lip could be produced, for example, from an elastomer, which is thicker in design along the foundation elements 48, and thinner and thus flexible in the middle section 46. The connecting lip may also consist of a composite material, for example fiber reinforced material, which is resined in the area of the foundation element 48, and remains untreated and thus elastic in the middle section 46.

Figure 4G:
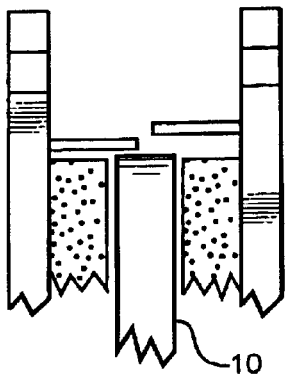
Figure 4H:
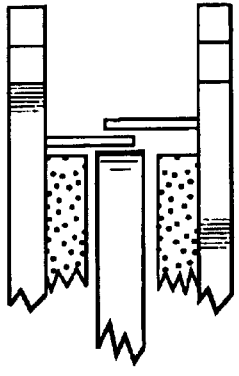
Figure 4I:
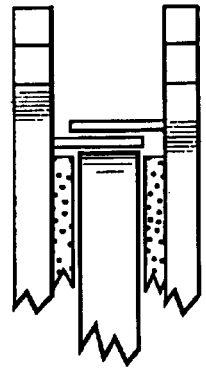

FIGS. 4G through 4I illustrate the functioning of the lips within a disk brake whose friction lining has been subject to abrasion. FIG. 4G shows the state of a new friction lining. FIG. 4H shows medium wear. FIG. 4I shows a completely worn set of brake linings which needs to be replaced. As is clearly illustrated in the Figures, the gap between the friction lining and the brake disk is protected from contaminants and dirt in each state of wear.

As can be seen clearly from the above illustrations, the preferred location of the lip is on one of the mounting plates of the brake lining. The lip can also be formed directly from the same material that comprises the mounting plate. For example, if the mounting plate is made out of cast iron, the lip may be formed directly during casting. However, the lip can also consist of the material that the friction lining is made of. It is even conceivable that the lip, the mounting plate, and the friction lining are all made from one material.

It should be noted that the lip will not seal the friction lining completely towards the brake disk, making it entirely possible, for example, in the case of an all-terrain vehicle that is driving through water, that water or mud may enter between the friction lining and the brake disk. But, since the lip generally will not touch on the brake disk, the frictional drag on the brake is also decreased while the brake is not engaged. Due to the fact that generally there is still a crevice between the lip and the brake disk, the brake lining can also be used in brake disks with internal ventilation without hindering the flow of air within the brake disk.

According to one of the aspects of the present invention, the invention provides a brake lining for disk brakes. This brake lining may feature both a mounting plate and a friction lining, where the mounting plate and the friction lining may be constructed from the same material. Further, the brake lining may feature location openings for retaining springs.

The brake lining and/or the friction lining and the mounting plate may be comprised of any friction lining material known to the specialist. Friction linings are typically manufactured from sintered materials or duroplastics as composite materials. Sintered materials usually consist of mixtures of ferrous and non-ferrous metals. Duroplastics can be made from phenolic resins, epoxy resins, etc. Duroplastics are often strengthened with fibers or other fillers to optimize the material characteristics. Such fibers may be, for example, natural, mineral, polymer, metallic, aramide, and/or carbon fibers. These fibers may be filamentous, chopped chaff, spun, woven, knit, and/or for example in the form of nonwoven fabric. The metallic fillers could be, for example, ferrous or non-ferrous metals, such as Fe, Sn, Zn, Ni, Ag, Al, Mn, and/or its alloys. Non-metallic filler materials could be, for example, mineral materials such as calcium hydrate, barite, unvulcanized rubber, and/or vermiculite.

In the preferred design, the brake lining also incorporates heat insulation. This heat insulation may be contained directly in the brake lining material, or it may form an independent layer within or on the brake lining. The exact design of the heat insulation is not important; it may be designed in the shape of integrated air pockets, special textures, for example sponge-like, or any other materials.

The disk brake, the caliper, and the brake linings can be controlled either hydraulically, pneumatically, electrically, magnetically, electromechanically, or mechanically. It should be noted that the disk brake according to the invention is suitable both for external and internal caliper disk brake designs. In case of an external caliper, the caliper extends around the brake disk from the outside as usual. In an internal caliper design, the brake caliper encloses the brake disk from inside. The brake linings according to the invention may be utilized either in fixed caliper disk brakes or floating caliper disk brakes. The brake linings according to the invention are suitable for calipers with one piston as well as for calipers with multiple pistons. The invention is not restricted to any version of the brake disk. The brake lining according to the invention can be utilized with any simple, perforated, grooved, textured, curved, and/or internally vented brake disks. The brake disk may be mounted either in a fixed or floating manner. It is even conceivable that the brake linings could be used in multiple disk brakes. The liquid cooling mentioned above could be designed for a truck in the form of compressed air cooling, for example, where the pneumatic system of the brake could, for example, fill a sealed repository, which can cool the brake, or portions of the brake, with compressed air when necessary. In vehicles lacking pneumatic brake systems, the brakes could be connected to an existing or a separate cooling circuit, such as those for oil or cooling water, for example.

The disk brake, the brake caliper, and the brake lining can be applied to any technical application where a rotating motion is to be slowed, that is, in all automotive applications, and in land, rail, water, and aviation vehicles where shafts and wheels must be slowed down. Additional applications are brakes for machines, engines, rotors, wind wheels, driving, etc.

What is claimed is:

1. A brake lining for a disk brake system having a brake disk, said brake lining comprising;
   a. a mounting plate;
   b. at least one friction lining having a friction face adapted to be oriented toward the disk brake; and
   c. a friction lining protector fastened to said mounting plate and extending beyond said friction face so that when said brake lining is installed, said friction lining protector covers a gap between the brake disk and said friction face to shield the gap from infiltration of debris from outside of said brake lining, and including at least one recess configured for receiving at least one friction lining protector of an opposing brake lining.

2. Set of brake linings with at least two brake linings for a disk brake, wherein at least one of the brake linings is a brake lining according to claim 1.

3. Set of brake linings as in claim 2, wherein the friction lining protector of the brake linings respectively being arranged in a staggered arrangement when installed.

4. Set of brake linings as in claim 2, wherein both brake linings are of essentially identical design.

5. Set of brake linings as in claim 2, wherein at least one of the brake linings of the set of brake linings incorporates at least one recess which is configured for receiving at least one friction lining protector of the brake lining of the set of brake linings.

6. The brake lining of claim 1, wherein said friction lining protector comprises at least one lip fabricated of flexible material.

7. The brake lining of claim 6, wherein said flexible material comprises rubber.

8. The brake lining of claim 1, wherein said friction lining protector is formed as one piece with said mounting plate.

9. The brake lining of claim 1, wherein said brake lining includes a complementary brake lining having an associated friction lining protector, wherein said friction lining protector of one of said brake linings is disposed toward said friction lining protector of the other of said brake linings in staggered arrangement.

10. The brake lining of claim 1, wherein said friction lining protector includes at least one lip of essentially rigid design.

11. The brake lining of claim 1, wherein said friction lining protector is formed as at least one separate part from said mounting plate.

12. The brake lining of claim 1, wherein said friction lining protector is configured when installed to rest on a face of the brake disk.

13. A brake lining for a disk brake system having a brake disk, said brake lining comprising:
   a. a mounting plate having laterally opposite ends arranged in a direction of rotation of the brake disk and a mounting portion on a radially outer region of said mounting plate;
   b. at least one friction lining mounted on said mounting plate radially inwardly of said mounting portion and extending toward said laterally opposite ends of said mounting plate and having a friction face adapted to be oriented toward the disk brake; and
   c. a friction lining protector disposed on said mounting plate radially between said friction lining and said mounting portion and extending laterally toward said opposite ends of said mounting plate and at least partially overlying said friction lining and extending axially beyond said friction face so that when said brake lining is installed said friction lining protector covers a gap between the brake disk and said friction face to shield the gap from infiltration of debris from outside of said brake lining.

* * * * *